Patented Aug. 22, 1944

2,356,247

UNITED STATES PATENT OFFICE 2,356,247

PROCESS FOR PRODUCING UNSATURATED DERIVATIVES OF ALPHA-HYDROXYISO-BUTYRIC ACID ESTERS

Philip M. Kirk, Stamford, and Paul P. McClellan, Old Greenwich, Conn., assignors to American Cyanamid Company, New York, N. Y., a corporation of Maine No Drawing. Application April 12, 1941,
Serial No. 388,264

8 Claims. (Cl. 260—486)

This invention relates to the production of unsaturated compounds and more particularly relates to the production of the unsaturated derivatives of alpha-hydroxyisobutyric acid, alpha-hydroxyisobutyric acid esters and acetone cyanhydrin.

It has been known in the past that the acetylated derivatives of alpha-hydroxyisobutyric acid esters and acetone cyanhydrin could be pyrolyzed to produce the corresponding unsaturated derivatives, i. e., esters of methacrylic acid and methacrylic nitrile. In these prior art processes it was necessary to go through the steps of producing and isolating the acetylated derivatives and then subjecting the acetylated derivatives to a pyrolyzing treatment. In accordance with the present invention we have discovered that unsaturated derivatives of alpha-hydroxyisobutyric acid, the esters of alpha-hydroxyisobutyric acid and acetone cyanhydrin can be produced by an improved process employing fewer steps and obtain yields which render the process more desirable economically. In carrying out our process an ester of alpha-hydroxyisobutyric acid, or acetone cyanhydrin, is mixed with acetic anhydride and the mixture passed through a heated tube over a catalyst, preferably a phosphoric acid catalyst, at a temperature of from about 400° to 600° C. to produce acetic acid and esters of methacrylic acid, or methacrylic nitrile, depending upon the starting substance. Acetic anhydride does not readily react with the hydroxy esters, and hydroxy nitriles referred to above to produce the acetylated derivatives unless the mixture treated with an acetylization catalyst and even under the best conditions the yields are frequently not more than 60 or 70%. The process of the present invention does not depend upon the production of an acetylated derivative and the yields based upon the starting materials compare favorably with the prior methods of first producing the acetylated compound and then carrying out the pyrolization step.

The alpha-hydroxyisobutyric acid esters generally are suitable for carrying out the present process, including the aliphatic esters, aromatic esters, cycloaliphatic esters, and heterocyclic esters; for example, the esters produced from the aliphatic alcohols, such as methyl, ethyl, propyl, butyl, octyl, decyl, and higher aliphatic alcohols may be employed. The aromatic esters, such as benzoyl and alpha-naphthylmethyl esters may be employed. The cyclohexanol or other cyclohexyl ester may be employed as well as the various heterocyclic alcohol esters, such as for example tetrahydrofurfuryl and the like.

The catalyst employed in our process preferably is a catalyst such as may be produced by saturating a porous solid substance with phosphoric acid and subjecting the wetted material to a heating and drying operation. The pyrolysis treatment is preferably carried out by passing the mixture of liquids into a heated tube at a temperature between about 400° and 600° C. over the phosphoric acid catalyst and, if desired, an inert gas such as nitrogen or carbon dioxide may be simultaneously passed through the tube. The tube is preferably arranged so that the liquid mixture is introduced into a portion heated to about 200° C. and in such a manner that by the time it reaches the porous material having the catalyst deposited thereon the mixture has been substantially converted to a vapor. The speed at which the material is passed through the heated zone and the temperature will vary somewhat depending upon whether the ester or the nitrile is being treated. In general the temperature should be high enough to substantially bring about instantaneous dehydration of the vapors as they come in contact with the catalyst in order to obtain maximum yields. At temperatures below 400° the yields drop off somewhat and at temperatures about 600° C. there is some decomposition. The best results are usually obtained when the reaction is carried out at a temperature of from 450° to 500° C.

Some of the unsaturated compounds produced by our process are polymerizable materials, and it may be desirable to carry the reaction out in the presence of polymerization inhibitors. Suitable inhibitors include substances such as sulfur, hydroquinone, copper bronze, tannic acid, resorcinol, and the anhydrous metal halides described in U. S. Patent No. 2,143,941.

The invention is illustrated in more detail by the following specific examples, it being understood, however, that the examples are for the purpose of illustration and the invention is not to be limited to the details set forth therein.

*Example 1*

Pea-sized pumice granules were soaked for about one hour in syrupy phosphoric acid and drained on a Büchner funnel. This material was placed in a pyrex tube about 30 inches long and having an outside diameter of 1 inch and when packed in the tube was sufficient to fill about one fourth of the zone to be heated. The tube was then heated to 490° C. and this temperature maintained while a solution comprising a mixture of 118 parts of methyl alpha-hydroxyisobutyrate and 110 parts of 95% acetic anhydride was pumped into the tube at a constantly controlled rate such that it required about two hours to introduce the entire mixture. The condensate obtained was a mixture of methyl methacrylate and acetic acid together with some unreacted ester and acetic anhydride. Upon fractionation methyl methacrylate representing a yield of about 80% of theory based upon the weight of the ester decomposed in the reaction was obtained.

*Example 2*

The process using the same reacting substances as described in Example 1 was carried out in which the entire heated zone of the tube was filled with the phosphoric acid pumice catalyst. In this instance a polymerization inhibitor, hydroquinone, was added to the condensation receiver. The yield of methyl methacrylate was about the same as in the preceding example.

The process described in Example 1 was repeated using a mixture of acetone cyanhydrin and acetic anhydride, methacrylic nitrile being obtained in good yield.

What we claim is:

1. A process for producing methyl methacrylate which comprises pyrolyzing a mixture of acetic anhydride and methyl alpha-hydroxyisobutyrate in the presence of a phosphoric acid catalyst.

2. A process for producing methyl methacrylate which comprises passing a mixture of acetic anhydride and methyl alpha-hydroxyisobutyrate through a heated tube over a phosphoric acid catalyst maintained at a temperature of from about 400° to 600° C.

3. A process according to claim 2 in which the temperature is maintained at about 490° C.

4. A method of producing unsaturated esters from alpha-hydroxyisobutyric acid esters which comprises pyrolyzing a mixture of acetic anhydride with an alpha-hydroxyisobutyric acid ester in the presence of a phosphoric acid catalyst.

5. A method for producing unsaturated esters from alpha-hydroxyisobutyric acid esters which comprises passing a mixture of acetic anhydride and an ester of alpha-hydroxyisobutyric acid through a tube containing a phosphoric acid catalyst at a temperature from about 400° to 600° C.

6. A method of producing esters of methacrylic acid from alpha-hydroxyisobutyric acid which comprises pyrolyzing a mixture of acetic anhydride with an alpha-hydroxyisobutyric acid ester in the presence of a porous solid saturated with phosphoric acid.

7. A process of producing esters of methacrylic acid which comprises passing a mixture of acetic anhydride and an ester of alpha-hydroxyisobutyric acid over a porous solid substance saturated with phosphoric acid and maintained at a temperature of from about 400° C.–600° C.

8. A process as in claim 7 wherein the solid substance is pumice.

PHILIP M. KIRK.
PAUL P. McCLELLAN.

CERTIFICATE OF CORRECTION.

Patent No. 2,356,247. August 22, 1944.

PHILIP M. KIRK, ET AL.

It is hereby certified that error appears in the printed specification of the above numbered patent requiring correction as follows: Page 1, second column, line 29, for the word "about" read --above--; and that the said Letters Patent should be read with this correction therein that the same may conform to the record of the case in the Patent Office.

Signed and sealed this 2nd day of January, A. D. 1945.

Leslie Frazer (Seal) Acting Commissioner of Patents.